US012500347B2

(12) United States Patent
Blauert

(10) Patent No.: US 12,500,347 B2
(45) Date of Patent: Dec. 16, 2025

(54) ANTENNA ASSEMBLY INCLUDING NEGATIVE HARMONIC WAVE-GROUND

(71) Applicant: Aptiv Technologies AG, Schaffhausen (CH)

(72) Inventor: John Karl Blauert, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 110 days.

(21) Appl. No.: 18/538,753

(22) Filed: Dec. 13, 2023

(65) Prior Publication Data

US 2025/0202125 A1 Jun. 19, 2025

(51) Int. Cl.
*H01Q 13/26* (2006.01)
*H01Q 1/48* (2006.01)

(52) U.S. Cl.
CPC ............... *H01Q 13/26* (2013.01); *H01Q 1/48* (2013.01)

(58) Field of Classification Search
CPC ................................ H01Q 13/26; H01Q 1/48
See application file for complete search history.

(56) References Cited

U.S. PATENT DOCUMENTS

2023/0083196 A1 3/2023 Yoo
2023/0099058 A1 3/2023 Ikegami et al.
2023/0144495 A1 5/2023 Doyle et al.

FOREIGN PATENT DOCUMENTS

DE 102020201268 A1 8/2021
EP 4283326 A1 11/2023

OTHER PUBLICATIONS

Extended European Search Report regarding European Patent Application No. 24180141.4, dated Nov. 25, 2024.

*Primary Examiner* — Graham P Smith
(74) *Attorney, Agent, or Firm* — Harness, Dickey & Pierce, P.L.C.

(57) ABSTRACT

An antenna assembly including: a circuit board with an integrated circuit configured to process a radio frequency (RF) signal, and a conductive trace extending from the integrated circuit; a waveguide plate over the circuit board, the waveguide plate including a waveguide configured to guide the RF signal at least one of to and from the conductive trace; and a conductive top plate over the waveguide plate. The conductive top plate includes: an outer surface and an inner surface facing the waveguide plate, the outer surface is opposite to the inner surface; a plurality of slots aligned with the waveguide and extending through the conductive top plate; and a receptacle recessed below the outer surface beside the plurality of slots, the receptacle configured to modify a radiation pattern of the RF signal passing across the receptacle from the plurality of slots.

16 Claims, 5 Drawing Sheets

ANTENNA ASSEMBLY INCLUDING NEGATIVE HARMONIC WAVE-GROUND

FIELD

The present disclosure relates to an antenna assembly including a negative harmonic wave-ground.

BACKGROUND

This section provides background information related to the present disclosure, which is not necessarily prior art.

Radar uses electromagnetic signals to detect and track objects. The electromagnetic signals are transmitted and received using one or more antennas. An antenna may be characterized in terms of gain and beam width, or more specifically pattern, which is a measure of the gain as a function of direction. By modifying the antenna pattern, the antenna may be customized for a specific application.

SUMMARY

This section provides a general summary of the disclosure, and is not a comprehensive disclosure of its full scope or all of its features.

In various features, the present disclosure provides for an antenna assembly including: a circuit board including an integrated circuit configured to process a radio frequency (RF) signal, and a conductive trace extending from the integrated circuit; a waveguide plate over the circuit board, the waveguide plate including a waveguide configured to guide the RF signal at least one of to and from the conductive trace; and a conductive top plate over the waveguide plate. The conductive top plate includes: an outer surface and an inner surface facing the waveguide plate, the outer surface is opposite to the inner surface; a plurality of slots aligned with the waveguide and extending through the conductive top plate, and a receptacle recessed below the outer surface beside the plurality of slots, the receptacle configured to modify a radiation pattern of the RF signal passing across the receptacle from the plurality of slots.

In further features, the receptacle defines at least one channel extending parallel to the plurality of slots.

In further features, the receptacle defines at least one ridge recessed beneath the outer surface.

In further features, the plurality of slots are aligned along the conductive top plate in a first direction; and the receptacle defines a pair of channels separated by a first ridge that is recessed beneath the outer surface, the pair of channels are spaced apart in a second direction that is perpendicular to the first direction.

In further features, the pair of channels are spaced apart at a period of 1.3 mm.

In further features, the receptacle defines a second ridge extending from a base of the receptacle to a maximum height co-planar with the outer surface of the conductive top plate, the second ridge is spaced apart from the first ridge in the second direction.

In further features, the pair of channels and the receptacle extend in the first direction parallel to the plurality of slots.

In further features, the second ridge is adjacent to a channel of the pair of channels.

In further features, the first ridge extends 0.8 mm from the base of the receptacle; the first ridge has a maximum cross-sectional width of 1.3 mm; the second ridge extends 1.1 mm from the base to the maximum height co-planar with the outer surface of the conductive top plate; and the second ridge has a maximum cross-sectional width of 0.9 mm.

In further features, the receptacle is a first receptacle on a first side of the plurality of slots, the plurality of slots are aligned in a first direction; a second receptacle is recessed beneath the outer surface on a second side of the plurality of slots opposite to the first side, the second receptacle is spaced apart from the plurality of slots in a second direction that is perpendicular to the first direction, the second receptacle configured to modify the radiation pattern of the RF signal transmitted from the plurality of slots; and the plurality of slots are between the first receptacle and the second receptacle.

In further features, the plurality of slots are a first plurality of slots, and the waveguide is a first waveguide; the conductive top plate further includes a second plurality of slots extending through the waveguide plate to the inner surface, the second plurality of slots aligned parallel to the first plurality of slots over a second waveguide of the waveguide plate; and the first receptacle is between the first plurality of slots and the second plurality of slots.

In further features, the plurality of slots are aligned in a first direction; and the receptacle defines a plurality of ridges, each one of the plurality of ridges extends in the first direction, is spaced apart in a second direction that is perpendicular to the first direction, and is recessed beneath the outer surface.

In further features, the plurality of slots are aligned in a first direction; the receptacle defines a plurality of ridges, each one of the plurality of ridges extends in the first direction and is spaced apart in a second direction perpendicular to the first direction; and the plurality of ridges progressively decrease in height away from the plurality of slots along the second direction.

The present disclosure further provides for, in various features, an antenna assembly including: a circuit board including an integrated circuit configured to process a radio frequency (RF) signal, and a conductive trace extending from the integrated circuit; a waveguide plate over the circuit board, the waveguide plate including a waveguide configured to guide the RF signal at least one of to and from the conductive trace; and a conductive top plate over the waveguide plate. The conductive top plate includes: an outer surface and an inner surface facing the waveguide plate, the outer surface is opposite to the inner surface; a plurality of openings extending through the conductive top plate to the waveguide, the plurality of openings aligned in a first direction over the waveguide; and a plurality of channels defined beneath the outer surface adjacent to the plurality of openings, each one of the plurality of channels extending in the first direction and spaced apart in a second direction that is perpendicular to the first direction.

In further features, a plurality of ridges define the plurality of channels, the plurality of ridges each have a maximum height that is at or beneath a plane extending across the outer surface.

In further features, the plurality of ridges include first ridges and second ridges, the first ridges are shorter than the second ridges.

In further features, each one of the first ridges is between two of the second ridges.

In further features, the second ridges are closer to the plurality of openings than the first ridges.

In further features, multiple ones of the first ridges are between two of the second ridges.

In various features, the present disclosure provides for an antenna assembly including: a circuit board including an integrated circuit configured to process a radio frequency (RF) signal, and a conductive trace extending from the integrated circuit; a waveguide plate over the circuit board, the waveguide plate including a waveguide configured to guide the RF signal at least one of to and from the conductive trace; and a conductive top plate over the waveguide plate. The conductive top plate includes: an outer surface and an inner surface facing the waveguide plate, the outer surface is opposite to the inner surface; a plurality of slots extending through the waveguide plate to the waveguide, the plurality of slots aligned in a first direction over the waveguide; and channels recessed beneath a plane extending across the outer surface, the channels extending in the first direction parallel to the plurality of slots and spaced apart in a second direction that is perpendicular to the first direction, the channels defined by ridges extending in the first direction, each one of the ridges has a maximum height that is at or below the outer surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure provides for an antenna with a conductive outer plate including negative wave-grounds adjacent to slots of the antenna. The negative wave-grounds are in the form of receptacles defined by the conductive outer plate. The receptacles are recessed below a plane extending across an outermost surface of the outer plate. The receptacles include a plurality of ridges defining channels. The receptacles may be customized to generate a radiation pattern of a custom width and total gain to fit any suitable application. For example, the heights, widths, spacing, and number of ridges may be varied to customize the radiation pattern, as explained herein.

Figure 1:
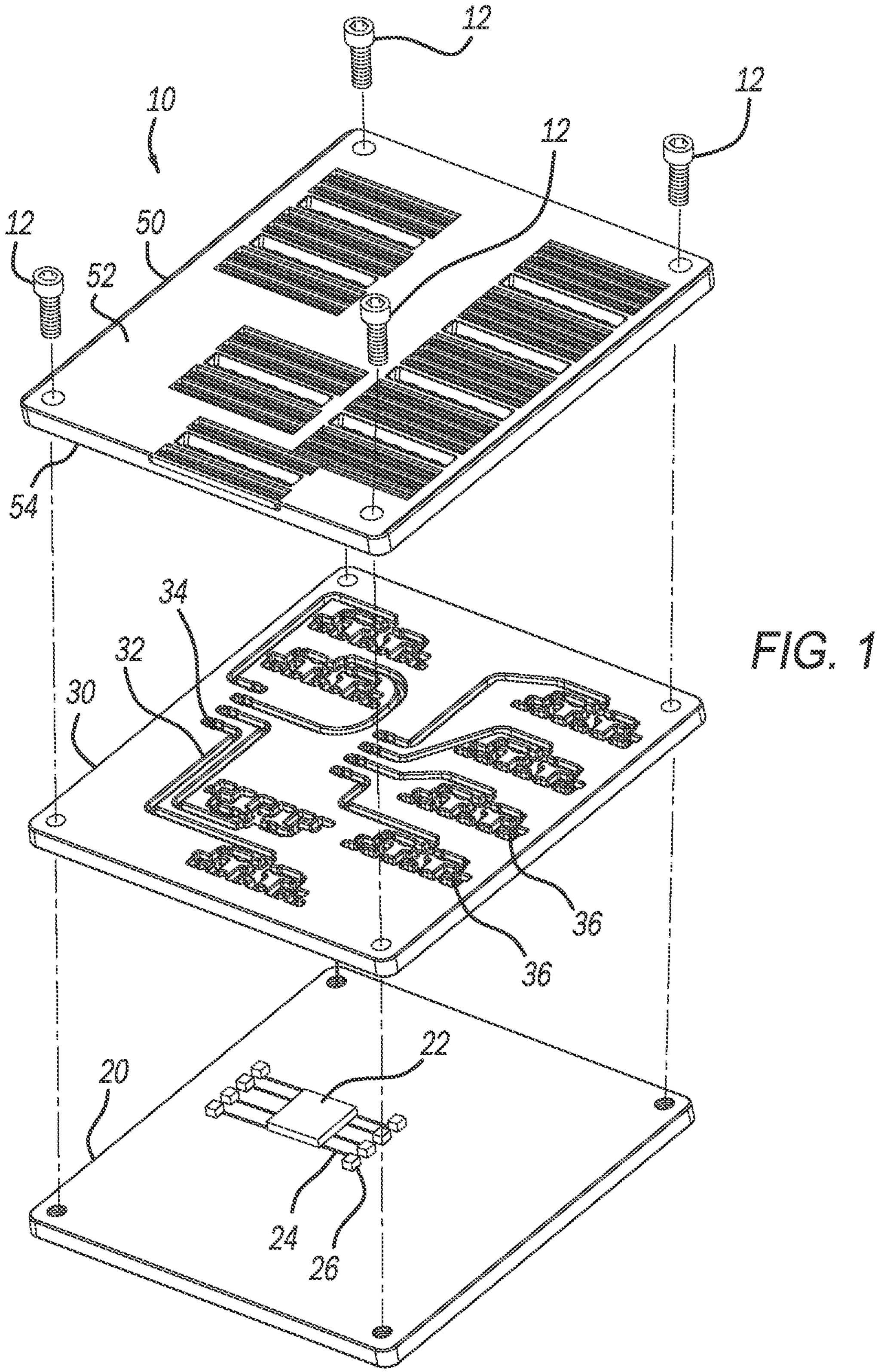
FIG. 1 is an exploded view of an antenna assembly in accordance with the present disclosure.

FIG. 1 illustrates an exemplary antenna assembly 10 in accordance with the present disclosure. The antenna assembly 10 is configured for use in any suitable application, such as in conjunction with an adaptive cruise control system for a vehicle. The antenna assembly 10 may be configured for any other suitable automotive or non-automotive use as well.

The antenna assembly 10 generally includes a circuit board 20, a waveguide plate 30, and a conductive top plate 50. The circuit board 20, the waveguide plate 30, and the conductive top plate 50 are secured together in any suitable manner, such as with any suitable fasteners 12. The waveguide plate 30 is secured between the circuit board 20 and the conductive top plate 50.

The circuit board 20 includes an integrated circuit (IC) 22 configured to process radio frequency (RF) signals. Extending from the IC 22 are conductive traces 24, which are electrically connected to the IC 22. Conductive pads 26 are at distal ends of the traces 24. The pads 26 and the traces 24 are configured to electrically conduct RF signals to and from the IC 22.

Mounted over the circuit board 20 is the waveguide plate 30. The waveguide plate 30 defines a plurality of waveguides 32. The waveguides 32 extend from feeding holes 34. The feeding holes 34 are aligned with the pads 26 of the circuit board 20. RF signals transmitted from the IC 22 are conducted along the traces 24 to the pads 26, and through the feeding holes 34 of the waveguide plate 30 to the waveguides 32. Conversely, received RF signals are directed by the waveguides 30 to the feeding holes 34, and to the IC 22 by way of the pads 26 and the traces 24. Distal ends 36 of the waveguides 32 opposite to the feeding holes 34 are positioned and shaped to correspond with slots of the conductive top plate 50, as explained herein.

The conductive top plate 50 has an outer surface 52 and an inner surface 54. The outer surface 52 is opposite to the inner surface 54. The inner surface 54 faces the waveguide plate 30. The outer surface 52 is an outer surface of the antenna assembly 10. The conductive top plate 50 is made of any suitable conductive material, such as any suitable metallic material.

Figure 2:
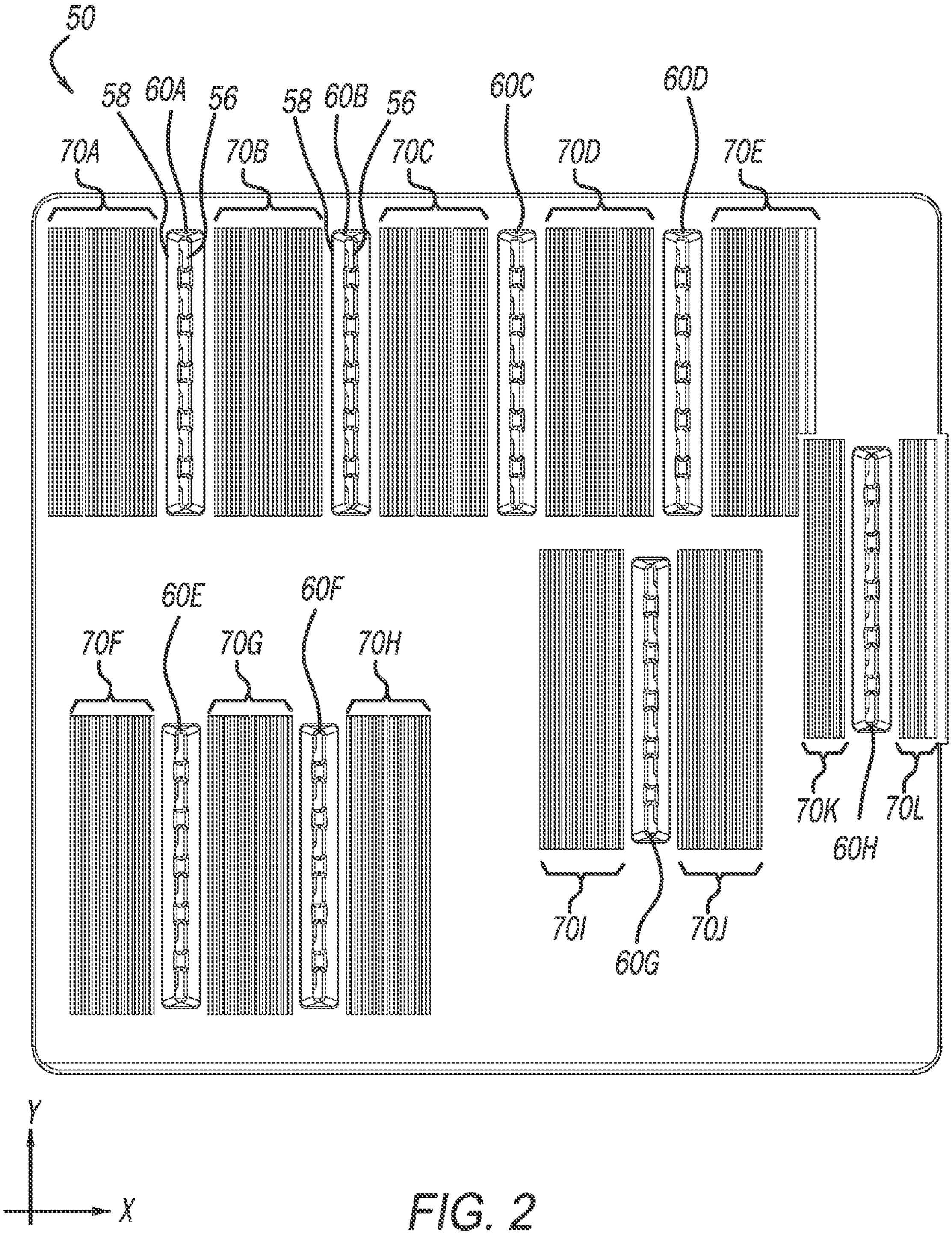
FIG. 2 is a plan view of an outer surface of a conductive top plate of the antenna assembly of FIG. 1.
Figure 3:
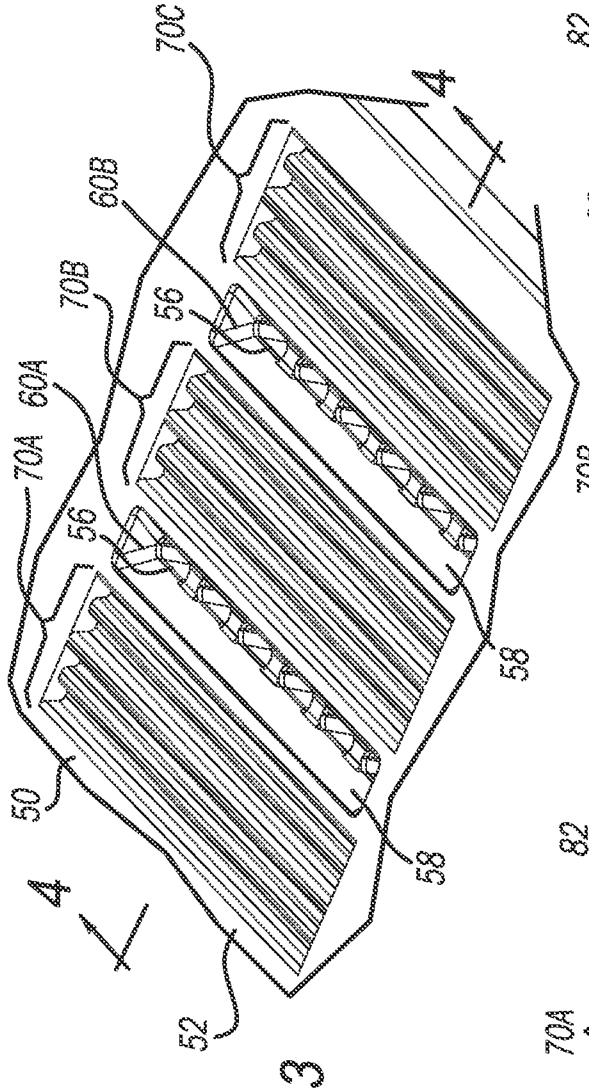
FIG. 3 is a perspective view of an area of the conductive top plate of FIG. 2.
Figure 4:
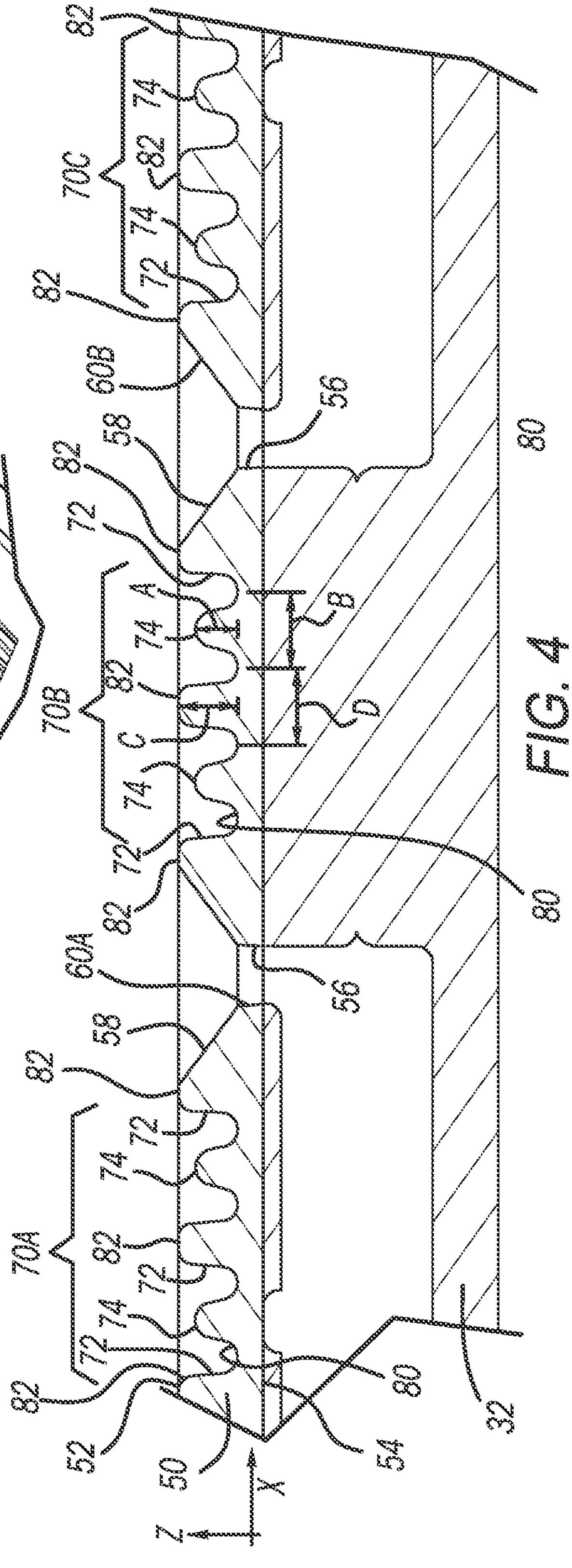
FIG. 4 is a cross-sectional view taken along line 4-4 of FIG. 3.

With continued reference to FIG. 1, and additional reference to FIGS. 2-4, the conductive top plate 50 defines a plurality of slots 56, which extend through the conductive top plate 50 to the waveguide plate 30. The slots 56 are aligned with the distal ends 36 of the waveguides 32. The slots 56 are configured to direct received RF signals to the distal ends 36 of the waveguides 32 and/or direct RF signals away from the distal ends 36 of the waveguides 32 during RF transmission. To facilitate receiving and/or transmitting RF signals, the conductive top plate 50 defines sloped surfaces 58 adjacent to the plurality of slots 56. The sloped surfaces 58 extend from the outer surface 52 into the conductive top plate 50 towards the slots 56.

The plurality of slots 56 are arranged in various groups, each of which is an antenna configured to receive and/or transmit RF signals based on the configuration of the IC 22. The conductive top plate 50 may include any suitable number of groups of the slots 56. In the example illustrated, the conductive top plate 50 includes eight groups: a first group 60A; a second group 60B; a third group 60C; a fourth group 60D; a fifth group 60E; a sixth group 60F; a seventh group 60G; and an eighth group 60H. Each one of the groups 60A-60H includes a plurality of the slots 56, such as six of the slots 56 in the example illustrated. Each one of the groups 60A-60H is aligned in a first direction along the conductive top plate 50. In the example of FIG. 2, the first direction is along the Y-axis. Although eight groups 60A-60H are illustrated, the conductive top plate 50 may include any suitable number of groups of the slots 56.

Each one of the groups 60A-60D of the slots 56 may be configured as a transmitting antenna, a receiving antenna, or a transceiver antenna. For example, the groups 60A-60D may be configured as transmitting antennas, and the groups 60E-60H may be configured as receiving antennas. Alternatively, the groups 60E-60H may be configured as transmitting antennas, and the groups 60A-60D may be configured as receiving antennas.

The conductive top plate 50 further includes a plurality of receptacles 70A-70L recessed beneath the outer surface 52 of the top plate 50. Any suitable number of receptacles 70A-70L may be included. In the example of FIG. 2, the conductive top plate 50 includes twelve receptacles 70A-70L. The receptacles 70A-70L are adjacent to the groups 60A-60H of slots 56. The receptacles 70A-70L may be on only one side of the plurality of slots 56, or on both sides of the plurality of slots 56. The receptacles 70A-70L are configured to modify the RF signals transmitted from, or received by, the plurality of slots 56, as explained herein.

With particular reference to FIG. 4, for example, each one of the receptacles 70A-70L defines at least one channel 72. The channels 72 extend parallel to the groups 60A-60H of the slots 56. In the example illustrated, the channels 72 extend along the Y-axis (see FIG. 2), which extends in the first direction. The channels 72 are spaced apart from the groups 60A-60H of the slots 56 in a second direction along the X-axis, which is perpendicular to the first direction.

The channels 72 are defined by ridges within the receptacles 70A-70L. As illustrated in the example of FIG. 4, the receptacles 70A, 70B, and 70C each include first ridges 74. The first ridges 74 run parallel to the slots 56 along the Y-axis in the first direction. The first ridges 74 extend from a base 80 of the receptacles 70A-70C along a Z-axis. The first ridges 74 extend from the base 80 to a maximum height that is beneath the outer surface 52 of the conductive top plate 50. The first ridges 74 define a pair of channels 72 on opposite sides thereof. In the example of FIG. 4, each one of the first ridges 74 are spaced apart from the groups 60A, 60B of the slots 56 in the second direction along the X-axis, which is perpendicular to the first direction along the Y-axis.

In the example of FIG. 4, the receptacles 70A-70C further define second ridges 82. The second ridges 82 extend from the base 80 to the outer surface 52. The second ridges 82 have a maximum height that is coplanar with the outer surface 52. Thus, the second ridges 82 are taller than the first ridges 74 in the direction of the Z-axis. The second ridges 82 extend parallel to the first ridges 74 in the first direction along the Y-axis. In the example of FIG. 4, each one of the second ridges 82 is spaced apart from the groups 60A, 60B of the slots 56 in the second direction along the X-axis, which is perpendicular to the first direction along the Y-axis. In the direction of the X-axis, each one of the receptacles 70A-70C includes outermost second ridges 82, which are adjacent to the angled surfaces 58.

With respect to the example of FIG. 4, each one of the first ridges 74 is between two of the second ridges 82. Between two of the first ridges 74 is one of the second ridges 82, which is at a center of the receptacles 70A, 70B, 70C midway between the outermost second ridges 82 along the X-axis. Outermost ones of the second ridges 82 are adjacent to the angled surfaces 58, and generally define outermost boundaries of the receptacles 70A, 70B, and 70C in the X-axis direction.

The first ridges 74 may extend from the base 80 to any suitable maximum height below the outer surface 52. For example, the first ridges 74 may extend to a first height A, which is 0.8 mm from the base 80, or about 0.8 mm from the base 80. The first ridge 74 may have a maximum cross-sectional width B of 1.3 mm, or about 1.3 mm, for example. The channels 72 defined on opposite sides of the first ridge 74 may be spaced apart at a sinusoidal period of 1.3 mm, about 1.3 mm, or any other suitable distance. The second ridges 82 extend from the base 80 to a maximum height C of 1.1 mm, for example. The second ridges 82 may have a maximum cross-sectional width D of 0.9 mm, for example.

Any of the other receptacles 70D-70L may be configured with the first ridges 74 and the second ridges 82 as described above and illustrated in FIG. 4, or configured in any other suitable manner. For example, due to the position of the eighth group 60H of slots 56 at a far side of the conductive top plate 50, the receptacles 70K and 70L on opposite sides of the group 60H may be relatively more narrow along the X-axis due to the size of the top plate 50. For example, each one of the receptacles 70K and 70L may include only one of the first ridges 74 and one of the second ridges 82. Alternatively, the receptacles 70K and 70L may each include only one or two of the first ridges 74 without including any of the second ridges 82.

Figure 5:
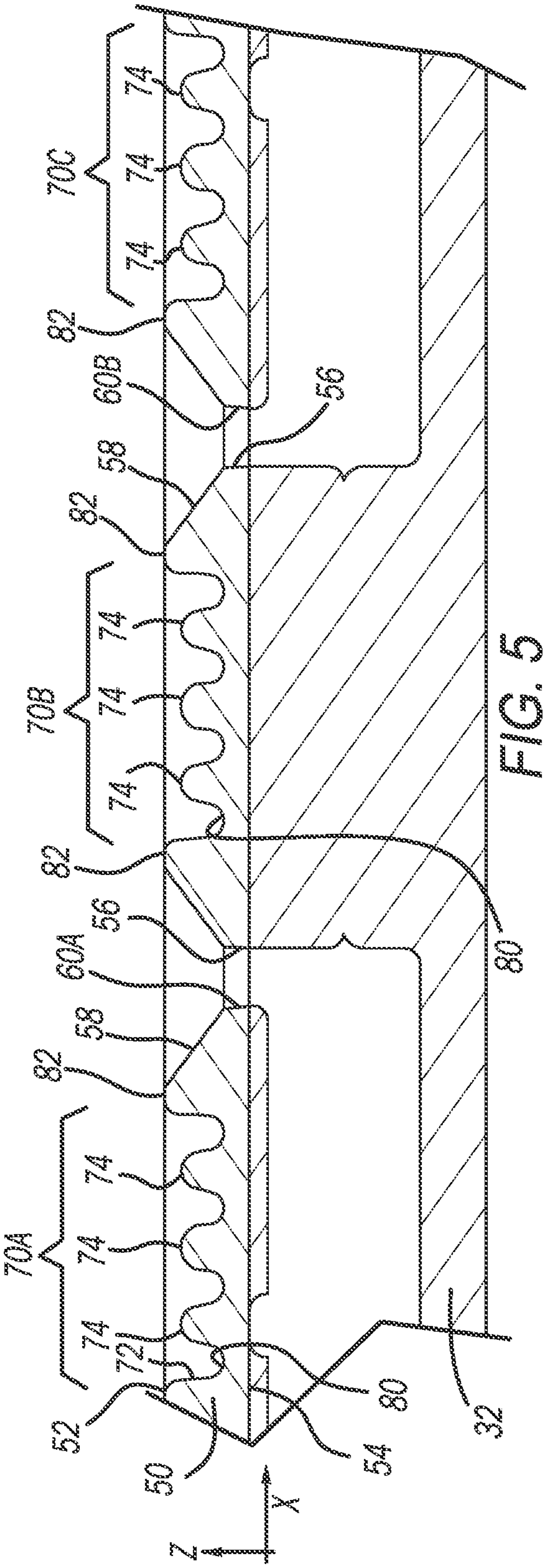
FIG. 5 is a cross-sectional view of another conductive top plate in accordance with the present disclosure.

FIG. 5 illustrates additional exemplary configurations of the receptacles 70A, 70B, and 70C. In the example of FIG. 5, each one of the receptacles 70A, 70B, and 70C includes three of the first ridges 74, each of which has a maximum height that is beneath the outer surface 52 of the conductive top plate 50. The three first ridges 74 of each receptacle 70A, 70B, 70C are between two of the second ridges 82, which are adjacent to the angled surfaces 58. Any of the other receptacles 70D-70L may be configured as illustrated in FIG. 5 with respect to the receptacles 70A-70C. The other receptacles 70D-70L may include any other suitable arrangement of the first ridges 74 and/or the second ridges 82.

Figure 6:
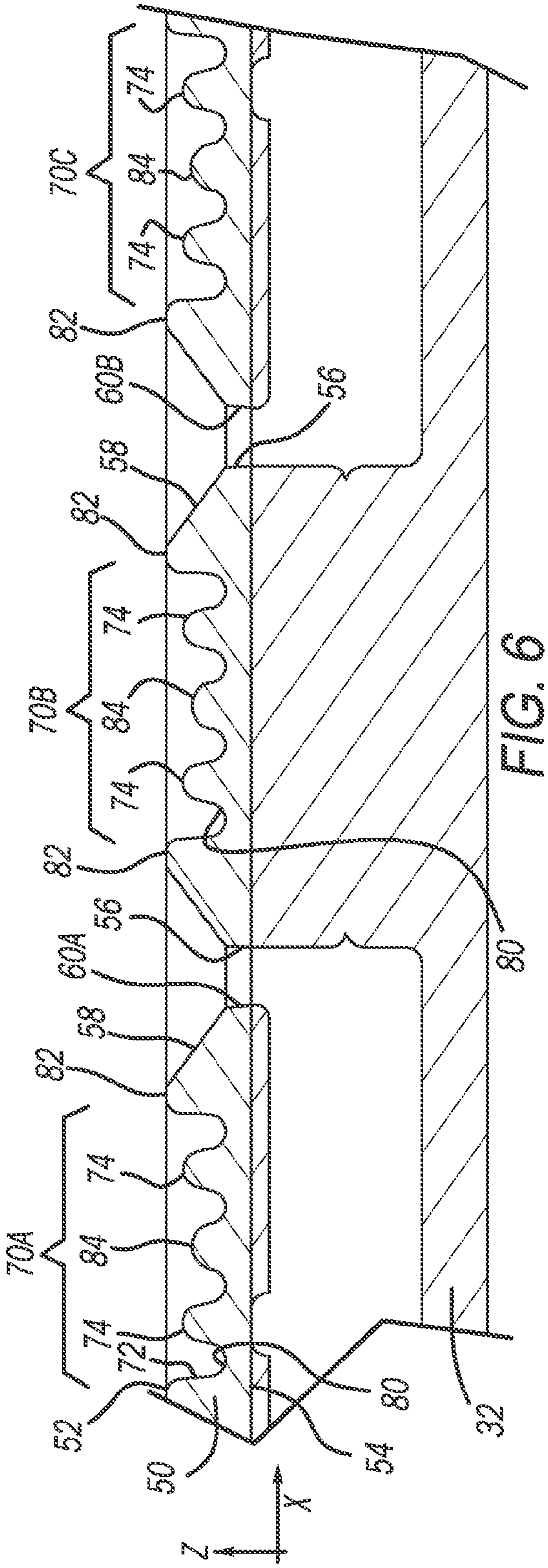
FIG. 6 is a cross-sectional view of an additional conductive top plate in accordance with the present disclosure.

An additional exemplary configuration of the receptacles 70A, 70B, and 70C is illustrated in FIG. 6. In the example of FIG. 6, each one of the receptacles 70A, 70B, and 70C includes a third ridge 84 at a center thereof along the X-axis, which extends in the second direction perpendicular to the groups of slots 56. The third ridges 84 are shorter than the first ridges 74 along the Z-axis, and thus do not extend as far from the base surfaces 80 as the first ridges 74. Each one of the third ridges 84 is between two of the first ridges 74. Outboard of the first ridges 74 in the direction of the X-axis are the second ridges 82, which are adjacent to the angled surfaces 58. Thus, the heights of the ridges decreases towards the centers of the receptacles 70A, 70B, and 70C from the second ridges 82, to the first ridges 74, and to the third ridges 84. Any of the other receptacles 70D-70L may be configured as illustrated in FIG. 6 with respect to the receptacles 70A-70C. The other receptacles 70D-70L may include any other suitable arrangement of the first ridges 74, the second ridges 82, and/or the third ridges 84.

Figure 7:
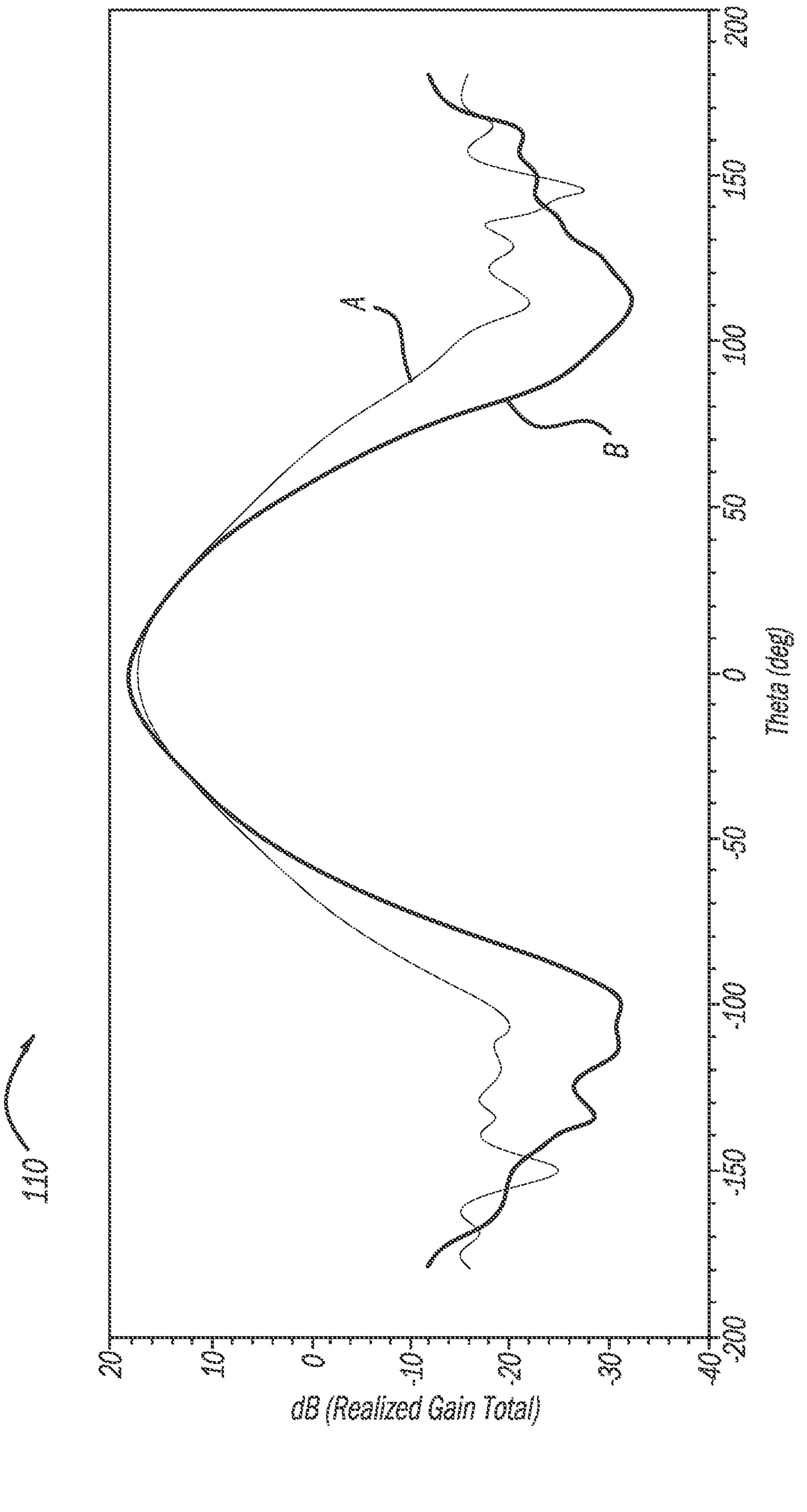
FIG. 7 is a graph illustrating an exemplary radiation pattern of an antenna assembly in accordance with the present disclosure.

FIG. 7 illustrates two exemplary radiation patterns of the antenna assembly 10; a first radiation pattern A and a second radiation pattern B. The radiation patterns are representative of the tunability of the antenna assembly 10, and specifically the receptacles 70A-70L thereof. The first radiation pattern A is representative of the antenna assembly 10 configured with ridges in the receptacles 70A-70L having a relatively greater number of even peaks. Second radiation pattern B is representative of the antenna assembly 10 configured with ridges in the receptacles 70A-70L having a relatively fewer number of even peaks. Thus, the first radiation pattern A may result from the configuration of FIG. 5, in which each of the receptacles 70A-70C (as well as potentially the receptacles 70D-70L) include three of the first ridges 74 of the same height in a row, and two of the second ridges 82 of the same height adjacent to the angled surfaces 58. The first radiation pattern A has the advantage of a wider pattern relative to the second radiation pattern B, but a lower gain at the center.

The second radiation pattern B has the advantage of a higher total gain at the center thereof relative to the first radiation pattern A, but is more narrow relative to the first radiation pattern A. The second radiation pattern B is representative of the antenna assembly 10 configured with the ridges 74, 82, 84 in the receptacles 70A-70L having fewer even peaks. For example, the second radiation pattern A may result from the configuration of FIG. 4 or 6, where peaks of the ridges are not as even. In the examples of FIGS. 4 and 6, none of the adjacent ridges have the same Z-axis height, and thus none are even.

The present disclosure thus advantageously provides for the antenna assembly 10 with a top plate 50 that may be modified to customize the radiation pattern. In particular, the receptacles 70A-70L serve as negative wave-grounds, which modify the RF signals passing across the receptacles 70A-70L to or from the slots 56. The negative wave-grounds of the receptacles 70A-70L may be customized to customize the radiation pattern. In particular, the ridges 74, 78, and 82 may be varied in height, width, spacing, and/or position about the receptacles 70A-70L to arrive at a radiation pattern suitable for a particular application, such as the radiation pattern A or the radiation pattern B of FIG. 7.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An antenna assembly comprising:

a circuit board including an integrated circuit configured to process a radio frequency (RF) signal, and a conductive trace extending from the integrated circuit;

a waveguide plate over the circuit board, the waveguide plate including a waveguide configured to guide the RF signal at least one of to and from the conductive trace; and a conductive top plate over the waveguide plate, the conductive top plate including, an outer surface and an inner surface facing the waveguide plate, the outer surface is opposite to the inner surface, a plurality of slots aligned with the waveguide and extending through the conductive top plate, and a receptacle recessed below the outer surface beside the plurality of slots, the receptacle configured to modify a radiation pattern of the RF signal passing across the receptacle from the plurality of slots;

wherein the receptacle defines at least one ridge recessed beneath the outer surface.

2. The antenna assembly of claim 1, wherein the receptacle defines at least one channel extending parallel to the plurality of slots.

3. The antenna assembly of claim 1, wherein:
the plurality of slots are aligned along the conductive top plate in a first direction; and
the receptacle defines a pair of channels separated by a first ridge that is recessed beneath the outer surface, the pair of channels are spaced apart in a second direction that is perpendicular to the first direction.

4. The antenna assembly of claim 3, wherein the pair of channels are spaced apart at a period of 1.3 mm.

5. The antenna assembly of claim 3, wherein the receptacle defines a second ridge extending from a base of the receptacle to a maximum height co-planar with the outer surface of the conductive top plate, the second ridge is spaced apart from the first ridge in the second direction.

6. The antenna assembly of claim 5, wherein the pair of channels and the receptacle extend in the first direction parallel to the plurality of slots.

7. The antenna assembly of claim 6, wherein the second ridge is adjacent to a channel of the pair of channels.

8. The antenna assembly of claim 7, wherein:
the first ridge extends 0.8 mm from the base of the receptacle;
the first ridge has a maximum cross-sectional width of 1.3 mm;
the second ridge extends 1.1 mm from the base to the maximum height co-planar with the outer surface of the conductive top plate; and
the second ridge has a maximum cross-sectional width of 0.9 mm.

9. The antenna assembly of claim 1, wherein:
the receptacle is a first receptacle on a first side of the plurality of slots, the plurality of slots are aligned in a first direction;
a second receptacle is recessed beneath the outer surface on a second side of the plurality of slots opposite to the first side, the second receptacle is spaced apart from the plurality of slots in a second direction that is perpendicular to the first direction, the second receptacle configured to modify the radiation pattern of the RF signal transmitted from the plurality of slots; and
the plurality of slots are between the first receptacle and the second receptacle.

10. The antenna assembly of claim 9, wherein:
the plurality of slots are a first plurality of slots, and the waveguide is a first waveguide;
the conductive top plate further includes a second plurality of slots extending through the waveguide plate to the inner surface, the second plurality of slots aligned parallel to the first plurality of slots over a second waveguide of the waveguide plate; and
the first receptacle is between the first plurality of slots and the second plurality of slots.

11. The antenna assembly of claim 1, wherein:
the plurality of slots are aligned in a first direction; and
the receptacle defines a plurality of ridges, each one of the plurality of ridges extends in the first direction, is spaced apart in a second direction that is perpendicular to the first direction, and is recessed beneath the outer surface.

12. The antenna assembly of claim 1, wherein:
the plurality of slots are aligned in a first direction;
the receptacle defines a plurality of ridges, each one of the plurality of ridges extends in the first direction and is spaced apart in a second direction perpendicular to the first direction; and
the plurality of ridges progressively decrease in height away from the plurality of slots along the second direction.

13. An antenna assembly comprising:
a circuit board including an integrated circuit configured to process a radio frequency (RF) signal, and a conductive trace extending from the integrated circuit;
a waveguide plate over the circuit board, the waveguide plate including a waveguide configured to guide the RF signal at least one of to and from the conductive trace; and
a conductive top plate over the waveguide plate, the conductive top plate including,
an outer surface and an inner surface facing the waveguide plate, the outer surface is opposite to the inner surface,
a plurality of openings extending through the conductive top plate to the waveguide, the plurality of openings aligned in a first direction over the waveguide, and
a plurality of channels defined beneath the outer surface adjacent to the plurality of openings, each one of the plurality of channels extending in the first direction and spaced apart in a second direction that is perpendicular to the first direction, and
a plurality of ridges defining the plurality of channels, the plurality of ridges each have a maximum height that is at or beneath a plane extending across the outer surface;
wherein the plurality of ridges include first ridges and second ridges, the first ridges are shorter than the second ridges; and
wherein each one of the first ridges is between two of the second ridges.

14. The antenna assembly of claim 13, wherein the second ridges are closer to the plurality of openings than the first ridges.

15. The antenna assembly of claim 13, wherein multiple ones of the first ridges are between two of the second ridges.

16. An antenna assembly comprising:
a circuit board including an integrated circuit configured to process a radio frequency (RF) signal, and a conductive trace extending from the integrated circuit;
a waveguide plate over the circuit board, the waveguide plate including a waveguide configured to guide the RF signal at least one of to and from the conductive trace; and
a conductive top plate over the waveguide plate, the conductive top plate including,
an outer surface and an inner surface facing the waveguide plate, the outer surface is opposite to the inner surface,
a plurality of slots extending through the waveguide plate to the waveguide, the plurality of slots aligned in a first direction over the waveguide, and
receptacles defining channels recessed beneath a plane extending across the outer surface, the channels extending in the first direction parallel to the plurality of slots and spaced apart in a second direction that is perpendicular to the first direction, the channels defined by ridges extending in the first direction, each one of the ridges has a maximum height that is at or below the outer surface.

* * * * *